United States Patent
McPherson et al.

(10) Patent No.: US 10,710,780 B2
(45) Date of Patent: Jul. 14, 2020

(54) CLOSURE FOR A CONTAINER NECK

(71) Applicant: Obrist Closures Switzerland GmbH, Reinach (CH)

(72) Inventors: Alexander Donald Meiklem McPherson, Falkirk (GB); David Conway Richardson, Brymbo (GB); Alistair Watters, Stirling (GB); Marco Antonelli, Edinburgh (GB)

(73) Assignee: GCL International S.A.R.L., Luxembourg (LU)

( * ) Notice: Subject to any disclaimer, the term of this patent is extended or adjusted under 35 U.S.C. 154(b) by 0 days.

(21) Appl. No.: 16/097,447

(22) PCT Filed: May 11, 2017

(86) PCT No.: PCT/EP2017/061269
§ 371 (c)(1),
(2) Date: Oct. 29, 2018

(87) PCT Pub. No.: WO2017/194649
PCT Pub. Date: Nov. 16, 2017

(65) Prior Publication Data
US 2019/0152660 A1    May 23, 2019

(30) Foreign Application Priority Data

May 11, 2016   (GB) .................................. 1608251.3

(51) Int. Cl.
*B65D 49/04*    (2006.01)
*B08B 9/08*    (2006.01)
(Continued)

(52) U.S. Cl.
CPC ............ *B65D 49/04* (2013.01); *B08B 9/0835* (2013.01); *B65D 41/3447* (2013.01);
(Continued)

(58) Field of Classification Search
CPC .. B65D 49/04; B65D 41/485; B65D 41/3447; B65D 2101/0053; B65D 2101/0038; B65D 49/02; B65D 2101/0023; B65D 49/06; B65D 49/08; B65D 49/10; B65D 49/12; B65D 50/00; B65D 50/02; B65D 50/06; B08B 9/0835
(Continued)

(56) References Cited

U.S. PATENT DOCUMENTS

| 1,863,338 A | 6/1932 | Hoffman |
| 2,806,620 A * | 9/1957 | Blanch .................. B65D 41/62 215/251 |

(Continued)

FOREIGN PATENT DOCUMENTS

| AT | 506996 | 1/2010 |
| DE | 202009001753 | 4/2009 |

(Continued)

*Primary Examiner* — Kareen K Thomas
(74) *Attorney, Agent, or Firm* — Lightbulb IP, LLC

(57) ABSTRACT

A closure (503) for a container neck (501), the closure (503) comprising a body (401) comprising a retention member (402) for retaining the body (401) on a container neck (501). The body (401) defines a retention member disconnection line (403) that is severable to release the retention member (402).

14 Claims, 4 Drawing Sheets

(51) Int. Cl.
 B65D 49/02 (2006.01)
 B65D 41/34 (2006.01)
 B65D 41/48 (2006.01)
(52) U.S. Cl.
 CPC .......... B65D 41/485 (2013.01); B65D 49/02 (2013.01); *B65D 2101/0023* (2013.01); *B65D 2101/0038* (2013.01); *B65D 2101/0053* (2013.01)
(58) Field of Classification Search
 USPC ............ 215/250, 253, 254, 256, 266, 14–30
 See application file for complete search history.

(56) References Cited

U.S. PATENT DOCUMENTS

| | | | | |
|---|---|---|---|---|
| 3,901,403 | A * | 8/1975 | Menke | B65D 41/62 215/251 |
| 4,109,816 | A * | 8/1978 | Faulstich | B65D 41/485 215/256 |
| 4,205,755 | A * | 6/1980 | de Wijn | B65D 41/348 215/252 |
| 4,458,817 | A * | 7/1984 | Guala | B65D 49/04 215/21 |
| 4,595,110 | A * | 6/1986 | Herr | B26F 1/18 215/252 |
| 4,597,500 | A * | 7/1986 | Stubbs | B65D 41/48 215/256 |
| 5,085,332 | A * | 2/1992 | Gettig | B65D 51/002 215/249 |
| 5,104,008 | A * | 4/1992 | Crisci | B65D 47/243 215/253 |
| 5,246,124 | A * | 9/1993 | Battegazzore | B65D 49/06 215/251 |
| 5,603,422 | A * | 2/1997 | Herrmann | B65D 41/3447 206/807 |
| 5,687,865 | A * | 11/1997 | Adams | B65D 41/0471 141/18 |
| 5,711,443 | A * | 1/1998 | Bennett | B65D 41/3428 215/251 |
| 5,715,959 | A * | 2/1998 | Pfefferkorn | B65D 41/3447 215/252 |
| 5,975,320 | A | 11/1999 | Bietzer | |
| 6,068,151 | A * | 5/2000 | Recendez M. | B65D 41/3447 215/252 |
| 6,619,492 | B2 * | 9/2003 | Battegazzore | B65D 49/04 215/21 |
| 6,854,612 | B2 * | 2/2005 | Thomson | B65D 49/04 215/21 |
| RE39,340 | E * | 10/2006 | Adams | B65D 47/243 215/253 |
| 7,398,890 | B2 * | 7/2008 | Thomson | B65D 49/04 215/21 |
| 2007/0023380 | A1 * | 2/2007 | Shingle | B65D 41/0421 215/217 |
| 2013/0068070 | A1 | 3/2013 | Mills | |
| 2014/0048537 | A1 | 2/2014 | McPherson | |

FOREIGN PATENT DOCUMENTS

| | | |
|---|---|---|
| DE | 102010020034 | 11/2011 |
| EP | 0502379 | 9/1992 |
| EP | 0847930 | 6/1998 |
| FR | 2142794 | 2/1973 |
| FR | 2535699 | 5/1984 |
| FR | 2696732 | 4/1994 |
| GB | 313218 | 6/1929 |
| GB | 2176467 | 12/1986 |
| WO | WO2005072941 | 8/2005 |

\* cited by examiner

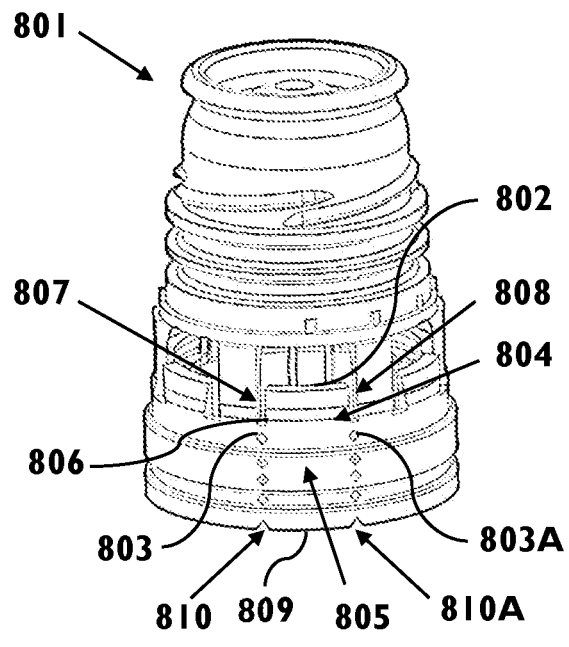
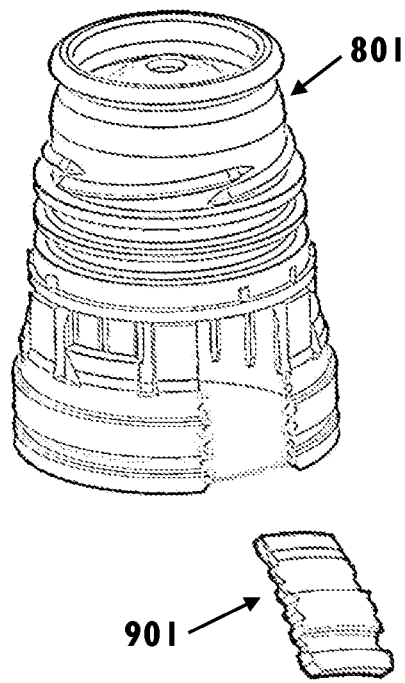
FIGURE 8
FIGURE 9
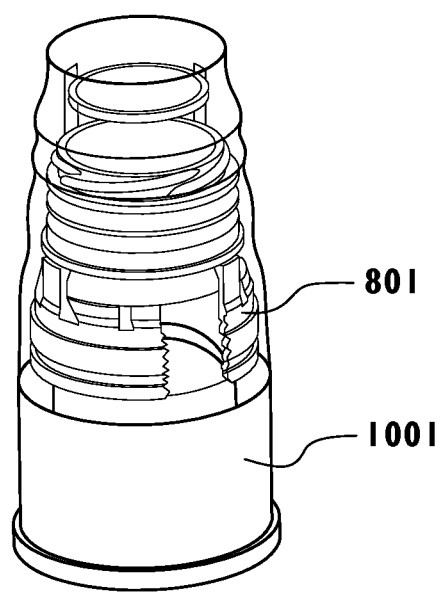
FIGURE 10

CLOSURE FOR A CONTAINER NECK

FIELD OF THE INVENTION

The present invention relates to a closure for a container neck, in particular to a closure comprising a body portion having at least one retention member for retaining the body portion on the container neck.

BACKGROUND OF THE INVENTION

A known type of closure for a container neck comprises a body portion that fits onto the container neck, a cap portion that removably engages the body portion, and an outer shell. In a known example, the body portion is a pourer body.

A closure of this type may include both metal and plastics materials and be used on a glass bottle.

In some applications, it is desirable for the body portion of the closure to be non-removable from the container neck following initial fitting. For example, particularly in the application of tamper-evident or security closures, it is beneficial for any attempted removal of the body portion from the container neck to cause the container to break or otherwise be evidently damaged.

It is known to provide the body portion of the closure with at least one retention member that engages the underside of a shoulder of the container neck to fit and retain the body portion on the container. In a known example, the retention member is a clip. According to one example, the clip takes the form of an inwardly projecting member that extends from the body portion under the container neck shoulder. International Patent Publication No. WO 2013/113435 A1 discloses a tamper-evident closure having this type of clip arrangement. According to one other example, the clip takes the form of a ledge at the lower edge of a window formed within the body portion, into which the container neck shoulder fits so as to extend over the ledge. International Patent Publication No. WO 2014/082863 A1 discloses a tamper-resistant closure having this type of clip arrangement.

A problem has been encountered relating to the removal of the body portion of the closure from the container neck when the container is presented for waste recycling.

SUMMARY OF THE INVENTION

According to a first aspect there is provided a closure for a container neck, the closure comprising a body comprising a retention member for retaining the body on a container neck, wherein the body defines a retention member disconnection line that is severable to release the retention member.

The retention member may be a clip.

The retention member disconnection line may be a line of weakness. The line of weakness may take the form of a line or reduced wall thickness of the body or a line of perforations in the body, The body may comprise more than one retention member.

The body may define more than one retention member disconnection line.

A retention member of the body may be adjoined to a removable region of the body. The removable region may be a removable ring or a removable tab.

In an embodiment, the retention member is a clip having a base adjoining a support region of the body at a junction, and the retention member disconnection line extends along the junction between the base of the clip and the support region of the body.

In an example, the body comprises a plurality of circumferentially spaced clips, each clip of the plurality of circumferentially spaced clips having a base adjoining the support region of the body at a junction; and the retention member disconnection line is circumferential and extends along the junction between the base of each dip of the plurality of circumferentially spaced clips and the support region of the body.

Thus, in an embodiment, severing the retention member disconnection line releases a plurality of retention members.

In an example, the retention member disconnection line is located within a groove.

A method of removing a closure according to this embodiment from a container neck may comprise the steps of: locating the container neck with closure fitted thereto within a closure removal tool comprising a rotatable cutting head unit, the rotatable cutting head unit supporting a pair of cutting wheels; aligning the pair of cutting wheels with the retention member disconnection line; and operating the rotatable cutting head unit to sever the retention member disconnection line by cutting the clips from the body.

In a different embodiment, the retention member is a clip having a base adjoining a support region of the body at a junction, the base of the clip having a first side and a second side, the support region extends between the junction and a lower edge of the body, and the retention member disconnection line extends from the junction to the lower edge of the body, to the first side of the base of the clip; and the body defines a second retention member disconnection line that extends from the junction to the lower edge of the body, to the second side of the base of the clip.

In an example, each of the retention member disconnection line and the second retention member disconnection line is a line of perforations.

In an example, each line of perforations terminates at the lower edge of the body with a notch.

Thus, in an embodiment, severing the retention member disconnection line releases a plurality of retention members.

A method of removing a closure according to this embodiment from a container neck may comprise the steps of: locating the container neck within a closure removal tool comprising a levering unit, the levering unit comprising a lever; aligning the lever with the lower edge of the body at a position between the retention member disconnection line and the second retention member disconnection line; and operating the closure removal tool to sever the retention member disconnection line and second retention member disconnection line by levering the support region and adjoined clip from the body.

In an embodiment, the body is formed from a plastics material.

In an embodiment, the body is a pourer body.

The closure may comprise a cap that removably engages the body.

The closure may comprise an outer shell. The outer shell may be formed from metal.

According to a further aspect, there is provided a container having a container neck fitted with a closure according to the first aspect.

The container may be a glass bottle.

According to another aspect there is provided a closure body for a closure, the closure body comprising a retention member in an operative position for retaining the body on a container neck, the closure body defining at least one retention member disconnection line severable to release the retention member from the operative position.

The closure body may comprise a plurality of retention members in an operative position for retaining the body on a container neck. The closure body may define at least one retention member disconnection line severable to release more than one retention member of the plurality of retention members.

Any suitable tool may be used to sever a retention member disconnection line.

The present invention provides improvements in the removal of a closure body from a container neck, to facilitate recycling.

Further particular and preferred aspects of the invention are set out in the accompanying dependent claims.

BRIEF DESCRIPTION OF THE DRAWINGS

The present invention will now be more particularly described, with reference to the accompanying drawings, in which:

FIG. 8 shows a closure body of a closure for a container neck, according to a second embodiment and prior to retention member removal;

FIG. 9 shows the closure body of FIG. 8 following retention member removal; and

FIG. 10 shows the closure body of FIG. 8 on a container neck and following release of a retention member.

DESCRIPTION

Example embodiments are described below in sufficient detail to enable those of ordinary skill in the art to embody and implement the apparatus, systems and processes described herein. It is to be understood that embodiments can be provided in many alternate forms and the invention should not be construed as limited to the examples set forth herein but by the scope of the appended claims.

Figures 1, 2:
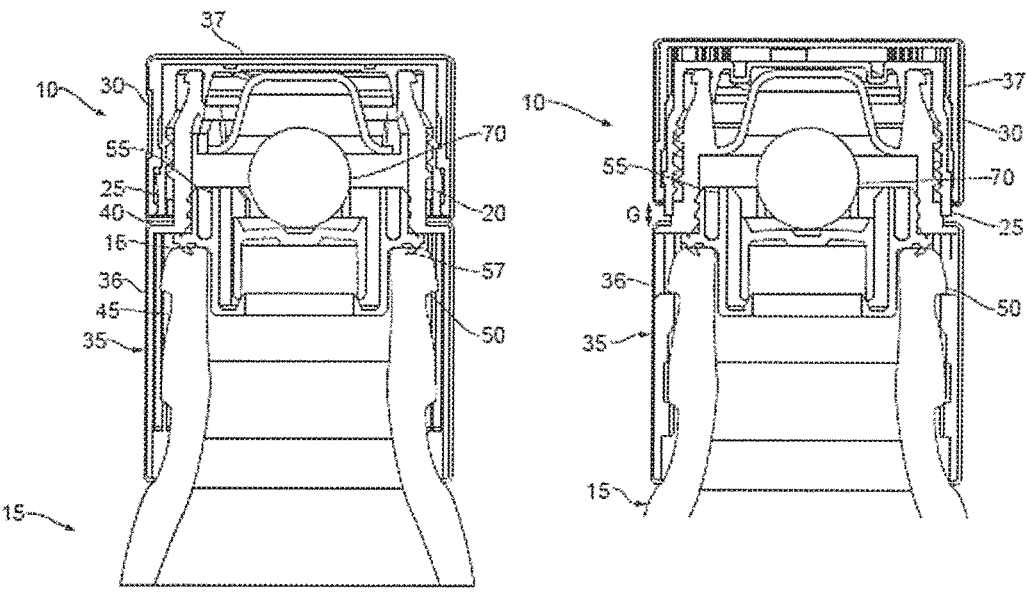
FIG. 1 is a section of a prior art closure, the prior art closure shown on a container neck and shown in a first, unopened position.
FIG. 2 is a section of the prior art closure of FIG. 1, the prior art closure shown on a container neck and shown in a second, opened position.
Figure 3:
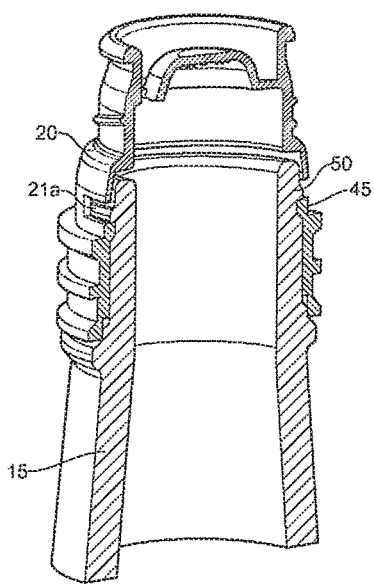
FIG. 3 is a section of a body of the prior art closure of FIG. 1, the body shown on a container neck.

FIGS. 1 to 3 show features of a prior art closure 10. The prior art closure 10 is shown secured on a container neck 15 of a container, such as a glass bottle. Prior art closure 10 is a gap-generating, tamper-evident closure.

The closure 10 comprises a body 20, an inner part 25 and an outer part 30. A metal shell 35 forms an outer casing to the closure 10 and is divided into a cylindrical lower shell part 36 and a cup-shape upper shell part 37. The lower and upper shell parts 36, 37 are separated at a split line 40, which is formed by a cutting process after the shell 35 has been applied over the body 20 and inner and outer parts 25, 30.

The inner and outer parts 25, 30 and the cup-shape upper shell part 37 together form a cap-like first portion and the body 20 and the cylindrical lower shell part 36 together form a captive second portion.

The body 20 is fixed onto the container neck 15 by clips 45 that project inwardly to engage under a shoulder 50 of the container neck 15. The clips 45 take the form of a ledge at the lower edge of a window 21a defined in the body 20 and into which the shoulder 15 of the container neck 15 extends when the closure 10 is fitted to the container neck 15.

The body 20 is a pourer body. A valve housing 55 is clipped into the body 20 and includes a sealing lip 57 which seals against the top surface 16 of the container neck 15. A float valve 65 is housed in the housing 55 and can seal against a valve seat 60 to prevent re-filling of the container. A valve control ball 70 is located on top of the float valve 65.

Prior to initial opening of the closure 10, the outer part 30 is in a first position relative to the inner part 25. To open the closure 10 for the first time, the upper shell part 37 of the shell 35 is rotated, which causes the outer part 30 to unscrew relative to the inner part 25. The outer part 30 unscrews until a locking mechanism, in the form of a ratchet arrangement, locks the outer part 35 to the inner part 25 in a second position relative to the inner part 25. With the outer and inner parts 25, 30 now locked together, the inner part 25 can then be unscrewed from the body 20 to separate the cap-like first portion 25, 30, 37 from the captive second portion 20, 36.

When the cap-like first portion 25, 30, 37 is screwed back onto the main body 20, there is a gap G between the lower and upper shell parts 36, 37. The gap G is present because the locking mechanism prevents the outer part 30 from being screwed completely back down relative to the inner part 25, so that the outer part 30 cannot be returned from the second position to the initial first position relative to the inner part 25.

The gap G between the lower and upper shell parts 36, 37 is an unobstructed gap, created using the ratchet arrangement of the locking mechanism. An 'unobstructed gap' is a gap that is created without using an obstruction member that is trapped between two parts (which can be cut to reverse the gap).

The gap G cannot be closed without destroying the closure 10. The irreversible opening event provides visual evidence that the closure 10 has been opened at least once.

Referring to FIG. 3, the body 20 may be used in an alternative type or arrangement of closure, for example a non-gap generating closure.

The present invention relates to the removal of a closure for a container neck, the closure comprising a body comprising at least one retention member for retaining the body on a container neck.

The present invention provides a closure for a container neck, the closure comprising a body comprising a retention member for retaining the body on a container neck, in which the body defines a retention member disconnection line that is severable to release the retention member. The body may comprise a plurality of retention members for retaining the body on a container neck, and may then define at least one retention member disconnection line that is severable to release at least one of the retention members. The retention member disconnection line may be a line of weakness.

The present invention also provides a container having a container neck fitted with the closure.

The present invention further provides a method of removing the closure from the container neck.

The body of the closure is removable from a container neck by severing the retention member disconnection line to release at least one retention member thereof from the operative position in which it acts to retain the body on the container neck.

Any suitable tool may be used to sever through the closure body along the retention member disconnection line.

Releasing at least one retention member from the closure body enables the closure body to be removed from the container neck more easily, and advantageously enables the closure to be removed from the container neck without causing damage to the container, which may then be reusable. In addition, releasing at least one retention member from the operative position prevents the closure body from being reused.

Thus, it is not possible to use the retention member disconnection line feature of the closure body to overcome any anti-removal or tamper-evident feature of the closure.

A first embodiment will now be described with reference to FIGS. 4 to 7.

Figure 4:
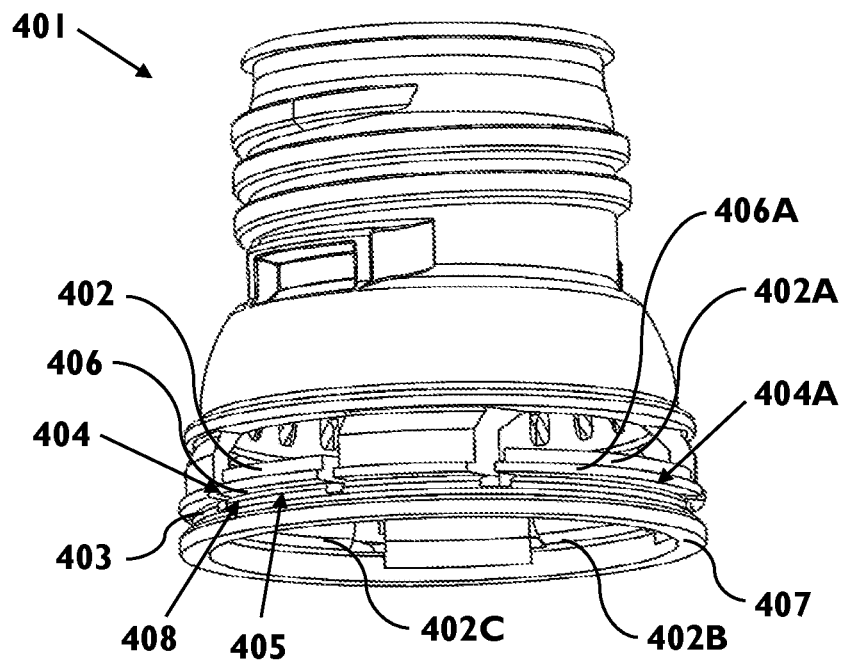
FIG. 4 shows a closure body of a closure for a container neck, according to a first embodiment.

A closure body 401 is shown in FIG. 4. The closure body 401 comprises a retention member 402 for retaining the closure body 401 on a container neck, and defines a retention member disconnection line 403 that is severable to release the retention member 402.

In this illustrated embodiment, the retention member 402 is a clip having a base 404 adjoining a support region 405 of the closure body 401 at a junction 406. The retention member disconnection line 403 extends along the junction 406 between the base 404 of the clip 402 and the support region 405 of the closure body 401. Severing the retention member disconnection line 403 results in release of the clip 402. In more detail, severing through the closure body 401 along the retention member disconnection line 403 results in separation of the clip 402 from the support region 405.

Further, in this illustrated embodiment, the closure body 401 comprises a plurality of circumferentially spaced clips 402, 402A, 402B, 402C, each clip 402, 402A having a base 404, 404A adjoining the support region 405 of the closure 401 body at a junction 406, 406A. In this example, the closure body 401 comprises four circumferentially spaced clips. However, the closure body 401 may comprise a different number of retention members. In this example also, the clips are evenly spaced in the circumferential direction of the closure body 401. However, a plurality of retention member may be spaced differently.

The retention member disconnection line 403 is circumferential and extends along the junction 406, 406A between the base 404, 404A of each clip 402, 402A and the support region 405 of the closure body 401.

Severing the retention member disconnection line 403 results in release of the plurality of clips 402, 402A, 402B, 402C. More specifically, severing through the closure body 401 along the retention member disconnection line 403 results in separation of the clips 402, 402A from the support region 405. In addition, severing through the closure body 401 along the retention member disconnection line 403 results in separation of the support region 405 from the remainder of the closure body 401. In this illustrated example, the support region 405 is a lower region of the closure body 401 that provides the lower edge 407 of the closure body 401. Thus, the retention member disconnection line 403 can be severed to remove a lower ring of the closure body 401.

According to this illustrated embodiment, the retention member disconnection line 403 is located within a groove 408. In an example, the groove 408 has a triangular profile.

In this first embodiment, the retention member disconnection line 403 is formed within a region of reduced wall thickness of the closure body 401. The retention member disconnection line 403 therefore represents a line of weakness around the closure body 401, along which the closure body 401 can be severed through more easily.

The retention member disconnection line 403 is severable using one or more severing devices.

The severing action may be a slicing or a chopping action. The severing action may be performed within an environment with one or more specific conditions, for example relating to temperature or pressure.

Figure 5:
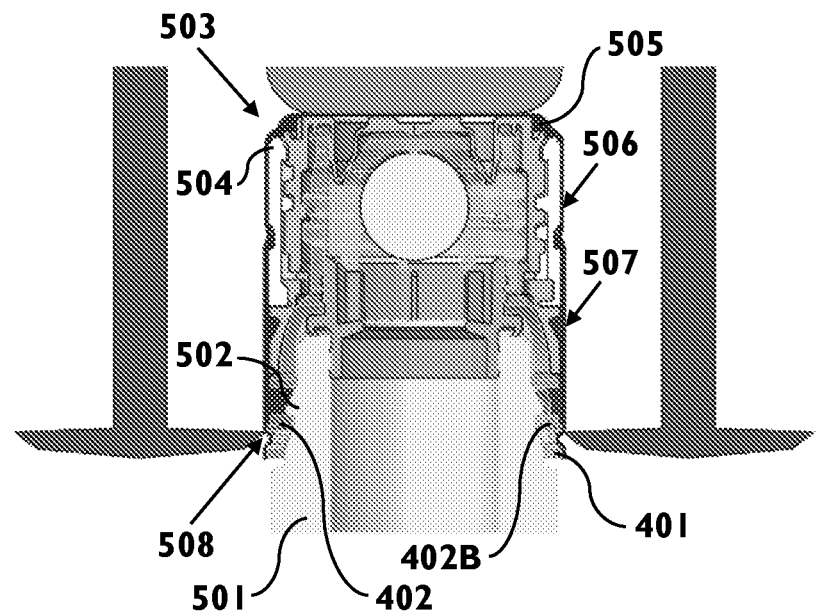
FIG. 5 illustrates a feature of the closure body of FIG. 4.

The closure body 401 is shown in FIG. 5 fitted on a container neck 501. It can be seen that the clips 402, 402B are in an operative condition, and engage the underside of a shoulder 502 of the container neck 501 to retain the closure body 401 on the container neck 501.

According to the present embodiment, the closure body 401 is a pourer body.

The closure body 401 is shown in this Figure within a closure 503 that also comprises a cap 504 that removably engages the closure body 401 and an outer shell 505. The outer shell 505 comprises an upper shell part 506 that provides a cap cover and a lower shell part 506 that provides a body cover.

According to this illustrated embodiment, the closure body 401 is formed from a plastics material, the outer shell 505 is formed from metal and the container neck 501 is the neck of a glass bottle.

In this illustrated example, a bead 508 is formed in the outer shell 505 in the region of the groove 408 in which the retention member disconnection line 403 is located. This bead 508, which may urge the clips 402, 402A into engagement with the container neck 501, can act as a guide for at least one severing device 507, as will be explained in further detail below.

The closure body 401 is removable from the container neck 501 by severing the retention member disconnection line 403 to release the clips 402.

According to this first embodiment, a cutter can be used to perform retention member removal.

Figure 6:
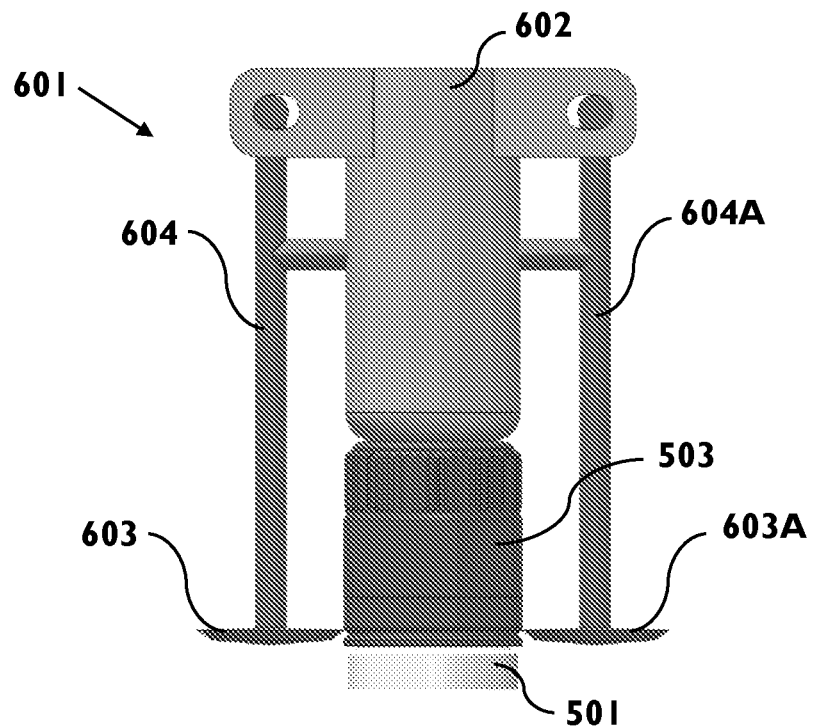
FIGS. 6 & 7 show a closure removal tool for use in removing the closure body of FIG. 4 from a container neck.
Figure 7:
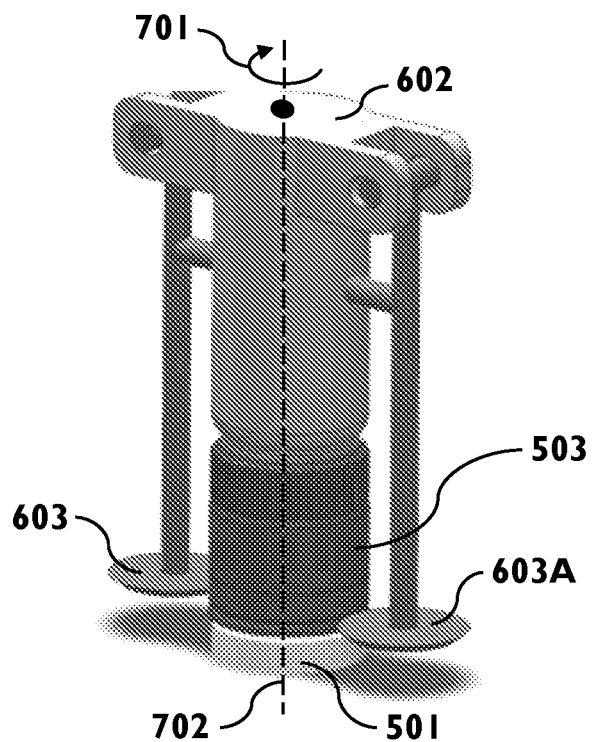

A closure removal tool 601 is shown in FIGS. 6 & 7. The closure removal tool 601 is usable to remove the closure 503 from the container neck 501.

Closure removal tool 601 comprises a rotatable cutting head unit 602, which supports a pair of cutting wheels 603, 603A. In the shown arrangement, the cutting wheels 603, 603A are attached to support arms 604, 604A that are connected to the rotatable cutting head unit 602 and usable to move the cutting wheels 603, 603A between a first position in which a closure to be removed from a container neck can be received with the closure removal tool 601, and a second position in which the cutting wheels 603, 603A are in contact with the received closure for removal. The rotatable cutting head unit 602 is rotatable, as indicated by arrow 701, about an axis of rotation, indicated at 702. The cutting wheels 603, 603A are fixed in rotation with the rotatable cutting head unit 602. Rotating the rotatable cutting head unit 602 causes the cutting wheels 603, 603A to revolve in a cutting plane. The rotatable cutting head unit 602 may be rotatable in only one or both of the clockwise and anti-clockwise directions.

To remove the closure 503 from the container neck 501, the container neck 501 with closure 503 fitted thereto is located within the closure removal tool 601. The cutting wheels 603, 603A are then moved inwards towards the receive closure (radial direction positioning) and aligned vertically with the circumferential retention member disconnection line (axial direction positioning). The rotatable cutting head unit 602 is then operated to sever the retention member disconnection line. In the illustrated arrangement, the closure removal tool 601 slices the clips from the closure body.

In FIGS. 5 to 7, the container neck 501 with the whole closure 503 (body 401, cap 504, shell 505) thereon is shown located within the closure removal tool 601. It is thus to be appreciated that the cutting wheels 603, 603A are able to sever through the metal outer shell 505 before severing through the closure body 401. In an alternative scenario, the container neck 501 with the closure 503 without the cap 504 (body 401, lower shell part 507) is located within the closure removal tool 601. In an alternative scenario, the container neck 501 with only the body 401 is located within the closure removal tool 601. Thus, the tool used to release a retention member from the closure body may be configured to sever the closure body only or to sever the closure body and at least one other closure component, for example a shell.

With the clips 402 released, the closure body 401 can be conveniently removed from the container neck, without damaging the container. In addition, with the clips 402 released, the closure body 401 cannot be reused.

A second embodiment will now be described with reference to FIGS. 8 to 10.

A closure body 801 is shown in FIG. 8. The closure body 801 comprises a retention member 802 for retaining the closure body 801 on a container neck, and defines a retention member disconnection line 803 that is severable to release the retention member 802.

In this illustrated embodiment, the retention member 802 is a clip having a base 804 adjoining a support region 805 of the closure body 801 at a junction 806. The clip 802 has a first side 807 and a second side 808.

The support region 805 extends between the junction 806 and a lower edge 809 of the closure body 801. The support region 805 also extends at least between the first and second sides 807, 808 of the clip 802. In the axial direction, the depth of the support region 805 is defined by the distance between the junction 806 and the lower edge 809 of the closure body 801. In the circumferential direction, the width of the support region 805 is at least the distance between the first and second sides 807, 808 of the clip 802.

The retention member disconnection line 803 extends from the junction 806 to the lower edge 809 of the closure body 801, to the first side 807 of the base 804 of the clip 802.

The clip 802 can be released from the operative position by severing the retention member disconnection line 803, which allows the clip 802 to be moved away from the operative position. In the shown arrangement, with the retention member disconnection line 803 severed, the support region 805, and attached clip 802, can be folded outwardly with an action that is similar to that of the action of opening a flap.

However, in this second illustrated embodiment, the closure body 801 defines a second retention member disconnection line 803A that extends from the junction 806 to the lower edge 809 of the closure body 801, to the second side 808 of the base 804 of the clip 802.

In this embodiment, and as shown in FIG. 8, each of the retention member disconnection lines 803, 803A is a line of perforations. Each line of perforations may comprise perforations of any suitable shape or shapes. In this illustrated example, the perforations are diamond shaped and are oriented in the depth direction of the support region 805 corner-to-corner.

As also shown in FIG. 8, in this embodiment, each line of perforations terminates at the lower edge 809 of the closure body 801 with a notch 810, 810A. In this illustrated example, each notch 810, 810A has a triangular shape.

Each retention member disconnection line 803, 803A represents a line of weakness in the closure body 801 that can be severed more easily.

According to this second embodiment, a lever can be used to perform retention member removal.

A tool (not shown) can be applied to the lower edge 809 of the closure body 801 to lever the clip 802 and support region 805 away from the remainder of the closure body 801.

As illustrated in FIG. 9, the arrangement of the closure body 801 is such that the clip 802 and the support region 805 are together provided as a removable tab 901 having side edges defined by the retention member disconnection lines 803, 804. The removable tab 901 is shown broken away from the remainder of the closure body.

According to a method of removing a closure from a container neck, the closure comprising the closure body 801, the container neck is located within a closure removal tool comprising a levering unit, the levering unit comprising a lever. The lever is aligned with the lower edge 809 of the closure body 801 (axial direction positioning), at a position between the retention member disconnection lines 803, 803A (circumferential direction positioning), and the closure removal tool is operated to sever the retention member disconnection lines 803, 803A by levering the support region 805 and adjoined clip 802 from the closure body 801.

The closure body 801 is shown in FIG. 10 on a container neck 1001 after the removable tab 901 has been severed. With the clip 802 released, the closure body 801 can be conveniently removed from the container neck 1001, without damaging the container. In addition, with the clip 802 released, the closure body 801 cannot subsequently be used in the same way as before the clip 802 was released.

In this example, the closure body 801 comprises six circumferentially spaced clips. However, the closure body 801 may comprise a different number of retention members. In this example also, the clips are evenly spaced in the circumferential direction of the closure body 801. However, a plurality of retention member may be spaced differently.

According to this second embodiment, the closure body 801 is formed from a plastics material, and is manufactured by a moulding process. It is to be appreciated that the closure body 801 may comprise more than one constituent component, and may comprise constituent components fabricated from different materials.

It is to be understood that the closure body described herein, comprising a body that comprises a retention member for retaining the body on a container neck and also defines a retention member disconnection line that is severable to release the retention member, may be used in different types of closures. It is to be understood that the closure body may be used with different types of container.

The closure body may comprise any suitable number and type or types of retention member, in any suitable arrangement. The closure body may also define any suitable arrangement of retention member disconnection line or lines.

The closure body may be arranged such that severing a retention member disconnection line causes the release of one only or more than one retention member.

Each retention member disconnection line may be arranged to be severed by one or more of: cutting, slitting, slicing, chopping, sawing, ripping, tearing, splitting, levering, prying, twisting, pushing, pulling, The closure body may be fabricated from any suitable material or combination of materials, and may be manufactured using any suitable process, technique or method or any suitable combination of processes, techniques or methods.

The closure body described herein provides improvements in the recycling of containers having a container neck provided with a closure.

Although illustrative embodiments of the invention have been disclosed in detail herein, with reference to the accompanying drawings, it is to be understood that the invention is not limited to the precise embodiments shown and that various changes and modifications can be effected therein by one skilled in the art without departing from the scope of the invention as defined by the appended claims.

The invention claimed is:

1. A closure for a container neck, the closure comprising a body and a cap that removably engages the body;
   the body comprises a retention member in an operative position for retaining the body on a container neck, wherein the retention member is a clip for engaging an underside of a shoulder of the container neck; and
   the body defines a retention member disconnection line that is severable to release the retention member from the operative position, wherein the retention member disconnection line is a line of weakness;
   the clip has a base adjoining a support region of the body at a junction; and
   the retention member disconnection line extends along the junction between the base of the clip and the support region of the body;
   the body comprises a plurality of circumferentially spaced clips, each clip of said plurality of circumferentially spaced clips having a base adjoining the support region of the body at a junction; and
   the retention member disconnection line is circumferential and extends along the junction between the base of each clip of said plurality of circumferentially spaced clips and the support region of the body;
   wherein said retention member disconnection line is located within a groove.

2. A closure as claimed in claim 1, wherein said body is formed from a plastics material.

3. A closure as claimed in claim 1, wherein said body is a pourer body.

4. A closure as claimed in claim 1, comprising an outer shell.

5. A closure as claimed in claim 4, wherein said outer shell is formed from metal.

6. A container having a container neck fitted with a closure as claimed in claim 1.

7. A closure for a container neck, the closure comprising a body and a cap that removably engages the body;
   the body comprises a retention member in an operative position for retaining the body on a container neck, wherein the retention member is a clip for engaging the underside of a shoulder of the container neck; and
   the body defines a retention member disconnection line that is severable to release the retention member from the operative position, wherein the retention member disconnection line is a line of weakness;
   the clip has a base adjoining a support region of the body at a junction, the base of the clip having a first side and a second side;
   the support region extends between the junction and a lower edge of the body; and
   the retention member disconnection line extends from the junction to the lower edge of the body, to the first side of the base of the clip; and
   the body defines a second retention member disconnection line that extends from the junction to the lower edge of the body, to the second side of the base of the clip;
   wherein each of the retention member disconnection line and the second retention member disconnection line is a line of perforations;
   wherein each line of perforations terminates at the lower edge of the body with a notch.

8. A closure as claimed in claim 7, wherein said body is formed from a plastics material.

9. A closure as claimed in claim 7, wherein said body is a pourer body.

10. A closure as claimed in claim 7, comprising an outer shell.

11. A closure as claimed in claim 10, wherein said outer shell is formed from metal.

12. A container having a container neck fitted with a closure as claimed in claim 7.

13. A method of removing a closure from a container neck,
   the closure comprising a body comprising a retention member in an operative position for retaining the body on a container neck, in which the retention member is a clip for engaging an underside of a shoulder of the container neck; and
   the body defining a retention member disconnection line that is severable to release the retention member from the operative position, in which the retention member disconnection line is a line of weakness,
   the clip has a base adjoining a support region of the body at a junction, and
   the retention member disconnection line extends along the junction between the base of the clip and the support region of the body;
   the body comprises a plurality of circumferentially spaced clips, each clip of said plurality of circumferentially spaced clips having a base adjoining the support region of the body at a junction; and
   the retention member disconnection line is circumferential and extends along the junction between the base of each clip of said plurality of circumferentially spaced clips and the support region of the body, in which said retention member disconnection line is located within a groove;
   the method comprising the steps of:
      locating the container neck with closure fitted thereto within a closure removal tool comprising a rotatable cutting head unit, the rotatable cutting head unit supporting a pair of cutting wheels;
      aligning the pair of cutting wheels with the retention member disconnection line; and
      operating said rotatable cutting head unit to sever the retention member disconnection line by cutting the clips from the body.

14. A method of removing a closure from a container neck,
   the closure comprising a body comprising a retention member in an operative position for retaining the body on a container neck, in which the retention member is a clip for engaging an underside of a shoulder of the container neck; and
   the body defines a retention member disconnection line that is severable to release the retention member from the operative position, in which the retention member disconnection line is a line of weakness;

the clip has a base adjoining a support region of the body at a junction, the base of the clip having a first side and a second side, the support region extends between the junction and a lower edge of the body, and the retention member disconnection line extends from the junction to the lower edge of the body, to the first side of the base of the clip; and the body defines a second retention member disconnection line that extends from the junction to the lower edge of the body, to the second side of the base of the clip;

the method comprising the steps of:

locating the container neck within a closure removal tool comprising a levering unit, the levering unit comprising a lever;

aligning the lever with the lower edge of the body at a position between said retention member disconnection line and said second retention member disconnection line; and operating said closure removal tool to sever said retention member disconnection line and second retention member disconnection line by levering the support region and adjoined clip from the body.

\* \* \* \* \*